United States Patent [19]
Jang et al.

[11] Patent Number: 5,582,559
[45] Date of Patent: Dec. 10, 1996

[54] SHIFT CONTROL DEVICE OF A HYDRAULIC CONTROL SYSTEM FOR AUTOMATIC TRANSMISSION

[75] Inventors: Jaeduk Jang; Kibeen Lim, both of Kyungki-do, Rep. of Korea

[73] Assignee: Hyundai Motor Company, Seoul, Rep. of Korea

[21] Appl. No.: 284,672

[22] PCT Filed: Dec. 29, 1993

[86] PCT No.: PCT/KR93/00121

§ 371 Date: Aug. 22, 1994

§ 102(e) Date: Aug. 22, 1994

[87] PCT Pub. No.: WO94/15809

PCT Pub. Date: Jul. 21, 1994

[30] Foreign Application Priority Data

Dec. 30, 1992 [KR] Rep. of Korea ............... 92-26763
Dec. 30, 1992 [KR] Rep. of Korea ............... 92-26764
Dec. 30, 1992 [KR] Rep. of Korea ............... 92-26765
Dec. 30, 1992 [KR] Rep. of Korea ............... 92-26770

[51] Int. Cl.$^6$ ................................................. F16H 61/26
[52] U.S. Cl. ..................... 477/130; 477/126; 477/127; 477/131
[58] Field of Search .......................... 475/119, 127, 475/128, 123; 477/126, 130, 131, 134

[56] References Cited

U.S. PATENT DOCUMENTS

| | | | |
|---|---|---|---|
| 4,056,991 | 11/1977 | Sakai et al. | 477/156 X |
| 4,136,584 | 1/1979 | Ishikawa | 477/156 X |
| 4,475,416 | 10/1984 | Underwood | 477/46 |
| 4,526,051 | 7/1985 | Kraus | 477/50 X |
| 4,776,240 | 10/1988 | Miki | 477/134 |
| 4,870,877 | 10/1989 | Hasegawa et al. | 477/125 |
| 4,942,782 | 7/1990 | Kuwayama et al. | 477/126 |
| 4,955,260 | 9/1990 | Oshidari | 477/45 |
| 5,131,298 | 7/1992 | Marusue | 477/144 |
| 5,154,100 | 10/1992 | Yamada et al. | 477/154 X |
| 5,293,790 | 3/1994 | Ohashi et al. | 477/131 X |
| 5,311,795 | 5/1994 | Yoshimura et al. | 477/131 X |

Primary Examiner—Khoi Q. Ta
Assistant Examiner—Peter Kwon

[57] ABSTRACT

A hydraulic pressure control system for an automatic transmission that includes a torque control regulating valve for converting a portion of the hydraulic pressure from an oil pump to a control pressure in accordance with a variation in the torque, and a control switch valve for supplying a torque pressure to a friction member prior to a shift valve being supplied with supply and release pressures for a friction member.

15 Claims, 5 Drawing Sheets

SHIFT CONTROL DEVICE OF A HYDRAULIC CONTROL SYSTEM FOR AUTOMATIC TRANSMISSION

BACKGROUND OF THE INVENTION

1. Field of the Invention

The present invention relates to a shift control device of a hydraulic control system for an automatic transmission system. More particularly, it relates to a shift control device of a hydraulic control system that may perform a five-speed shift control and improve shift sense and speedy response ability of operating elements, and includes a means for preventing a reverse when a shift lever is shifted to a reverse operation of the vehicle "R" range during a forward running.

2. Description of the Related Art

A conventional automatic transmission for a vehicle has a torque converter and a multiple stage transmission gear mechanism connected with the torque converter, which includes a hydraulically-actuated friction member for selecting one among a plurality of gear stages of the transmission gear mechanism in accordance with vehicle operating conditions.

A hydraulic pressure generated by an oil pump is provided to the friction members for transmitting dynamics of the multiple stage transmission gear mechanism via the shift valves of the hydraulic control system.

The commonly-used automatic transmission for a vehicle has the torque converter which generally includes a pump impeller connected with an engine output shaft to be driven thereby, a turbine runner connected with an input shaft of the transmission system in and a stator disposed between the pump impeller and the turbine runner. According to this structure, the hydraulic fluid is circulated by the engine-driven pump impeller through the turbine runner with the aid of the stator which functions to deflect the hydraulic fluid from the turbine runner to a direction where fluid flow does not disturb a rotation of the pump impeller when the fluid flows into the pump impeller. An automatic shift is made by an operation of the friction members such as clutches or a kick-down brake at each shift change. The above friction members selectively operate due to the change in the direction of fluid flow by a plurality of valves of the hydraulic control device. Besides, a manual valve, a port of which is converted by selecting a position of a selector lever, is designed to be supplied with a fluid pump and to supply the fluid to a shift control valve. The shift control valve provides a hydraulic pressure to one or more than one shift valve among a plurality of shift valves according to an ON-OFF operation of a shift control solenoid valve controlled by a transmission control unit, and controls these shift valves to form a line.

Such a hydraulic control system is disclosed in U.S. Pat. Nos. 4,776,240, 4,870,877 and 5,131,298.

Neither a method for improving shift sense nor a method for ensuring rapid response ability is proposed in these prior art techniques. Besides, they do not propose a method for preventing the driving "D" range from being shifted to the reverse "R" range.

A valve spool of the shift valve is elastically supported by an elastic member, and has a problem that the size of the valve body is enlarged as large as the space where the elastic member is installed.

SUMMARY OF THE INVENTION

In order to solve these problems of the conventional art technologies, the present invention provides a shift control device of a hydraulic control system for an automatic transmission system that can improve shift sense, with carrying out a fifth-speed shift control.

It is another object of the present invention to provide a shift control device of a hydraulic control system for an automatic transmission system capable of making a rapid operating response of friction elements by supplying a torque pressure before a clutch supply pressure and a release pressure are supplied to a shift valve.

It is still another object of the present invention to provide a shift control device of a hydraulic control system for an automatic transmission system that may reverse control when a shift lever is converted from a driving "D" mode to a reverse "R" mode.

In order to achieve the above-mentioned objects, the present invention provides a hydraulic pressure control system for an automatic transmission. The system comprises:

an oil pump for generating the hydraulic pressure;

a plurality of friction members which are controlled by the hydraulic pressure in proportion to forward and reverse speed ratios;

a plurality of shift valves for transmitting a torque of a torque converter to gear elements of each speed ratio;

a torque control regulating valve for controlling and variably generating the hydraulic pressure from the oil pump in accordance with a variation of the torque;

a control switch valve for selectively supplying the hydraulic pressure generated by the torque control regulating valve to first or second speed shift lines to first engage the friction members and for enabling the hydraulic pressure to work as a shift valve control pressure or a friction member engaging pressure;

first-second, second-third, third-fourth, and fourth-fifth speed shift valves each of which ports are changed for engaging the friction members with a control pressure supplied from the control switch valve and thereafter for engaging the friction members with a drive pressure;

second clutch, third clutch, fourth band, and over drive unit valves for supplying the torque pressure and the drive pressure supplied from the shift valves to the friction members; and a reverse clutch inhibitor valve for interrupting the hydraulic pressure which is supplied to a low/reverse clutch so that, when a shift lever is shifted to a reverse "R" range, a reverse shift control does not occur.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
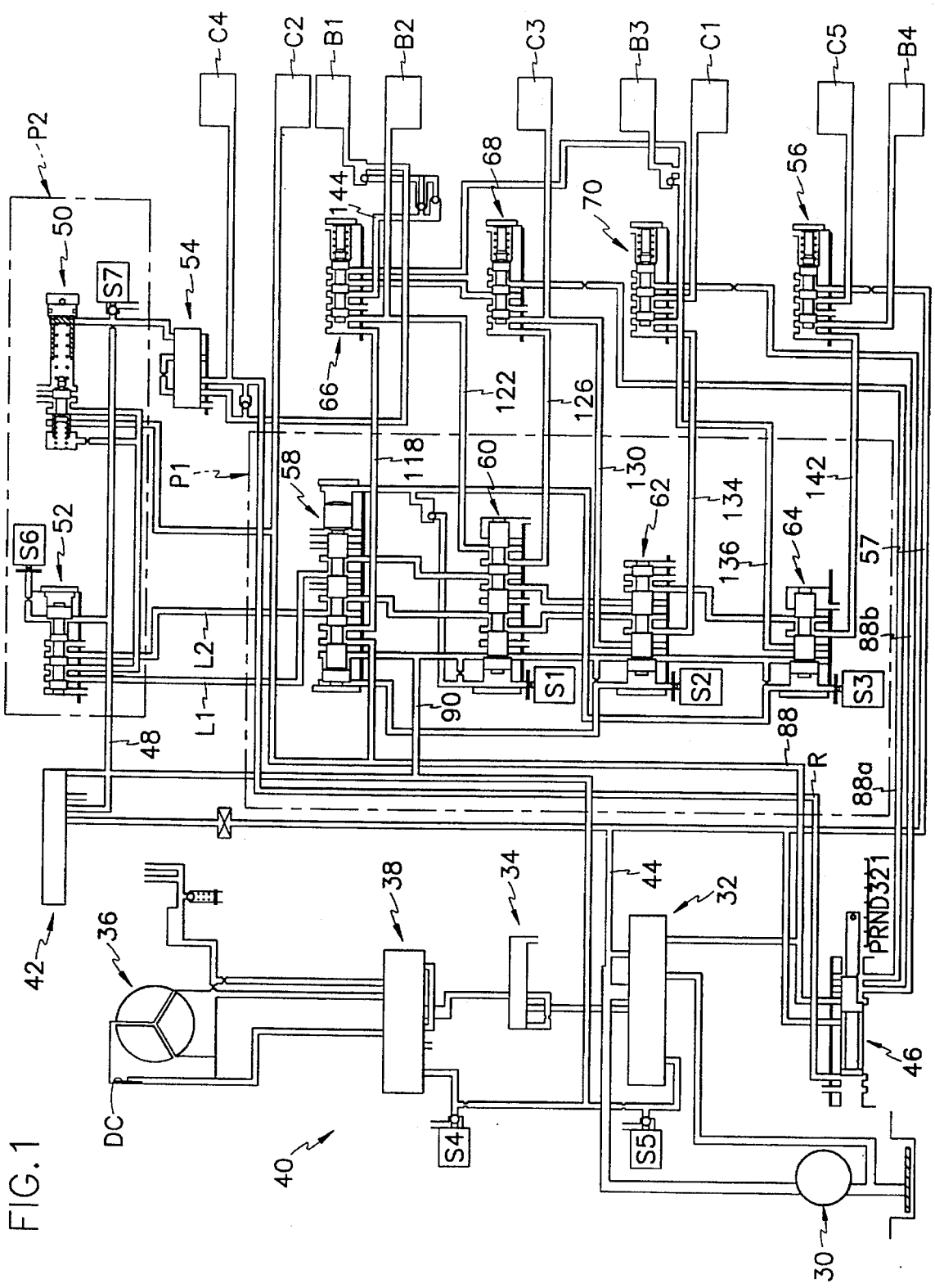
FIG. 1 shows a hydraulic control system applying a shift control device of the present invention, and is a hydraulic pressure circuit diagram in a neutral stage.

FIG. 1 is a schematic diagram of a hydraulic control system for an automatic transmission system in accordance with the present invention.

The hydraulic control system includes a damper clutch control part 40 having an oil pump 30 that rotates by an input shaft of the automatic mechanism to pressurize oil in an oil pan; a pressure regulating valve 32 connected to an output of the oil pump 30 to convert a clutch engaging pressure into a line pressure; a pressure converting supply valve 34 for receiving and controlling a hydraulic pressure controlled in the pressure control valve 32; and a clutch converting regulating valve 38 communicating with an outlet port of the pressure converting supply valve 34 to engage or release a damper clutch DC within a torque converter 36.

Valve spools of the pressure regulating valve 32 and clutch converting regulating valve 38 receive variable force according to opening or closing of solenoid valves S4, S5 for exhausting or interrupting a hydraulic pressure regulated by a reducing valve 42 for making a pressure lower than a line pressure and thereby protecting a hydraulic pressure line.

A line pressure line 44 diverges from the oil pump 30 and is connected respectively to the reducing valve 42 and a manual valve 46 to provide a hydraulic pressure thereto.

The reducing valve 42 includes an exit port for regulating and exhausting a line pressure, that is connected with a reducing line 48, and is designed to provide a controlled hydraulic pressure to a torque control regulating valve 50 for generating an engaging pressure required for operation of the clutch and to a control switch valve 52 for dividing the hydraulic pressure to a first speed shift line L1 and a second speed shift line L2.

A reverse pressure line R receiving the line pressure from the manuals valve 46 is directly connected to a reverse input clutch C4, and this reverse pressure line R is connected to a reverse clutch inhibitor valve 54 to serve as a control pressure.

Another line 57 diverging from the line pressure line 44 is directly connected to an over drive unit direct clutch C5 via an over drive unit valve 56 to supply the line pressure.

The first speed shift line L1 forms the hydraulic pressure that is supplied subsequently to a first-second speed shift valve 58 and a second-third speed shift valve 60 and a third-fourth speed shift valve 62 and a fourth-fifth speed shift valve 64 through the first shift line. The second shift line L2 is designed to transmit the engaging pressure when valve spools of the shift valves 58, 60, 62, 64 are displaced.

The above shift valves 58, 60, 62, 64 are respectively connected with a second clutch valve 66, a third clutch valve 68, a fourth band valve 70 and the over drive unit valve 56 to provide the hydraulic pressure and produce the displacement of the valve spools. Accordingly, a forward clutch C2, a low/reverse clutch B1, a second clutch B2, a third clutch C3, a fourth band B3, an overrun forward clutch C1 and a fifth clutch B4 are engaged or released.

Figure 2:
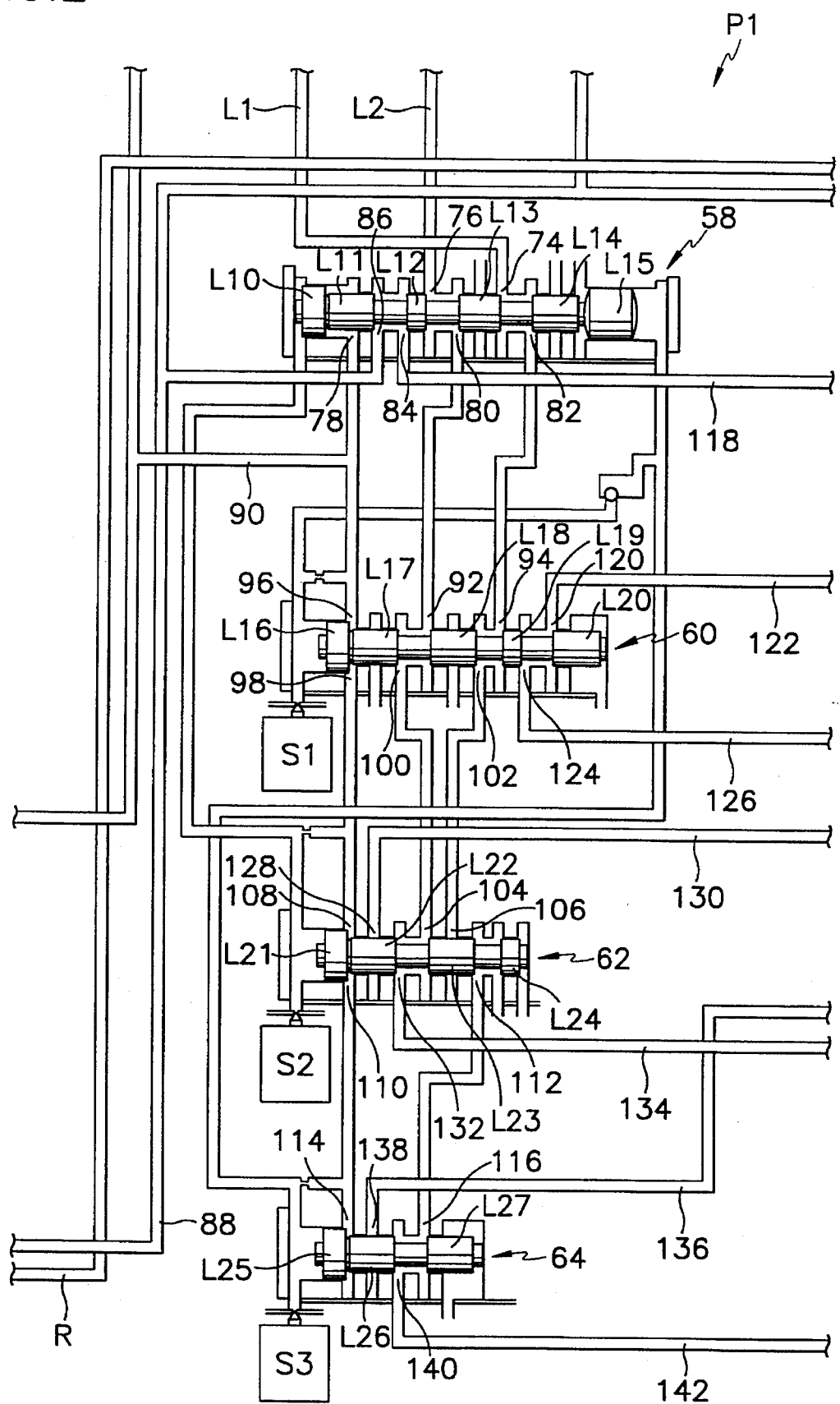
FIG. 2 is a detailed circuit diagram of a part P1 of FIG. 1.

Referring to FIG. 2, the first-second speed shift valve 58 is provided with a first port 74 and a second port 76 respectively communicating with the first shift line L1 and the second shift line L2, and also includes third, fourth and fifth ports 78, 80, 82 communicating with the second-third shift valve 60, and a sixth port 84 communicating with the second clutch valve 66.

A seventh port 86 is formed between the third port 78 and the sixth port 84, and the seventh port 86 communicates with the drive pressure line 88 connecting the manual valve 46 to receive a drive pressure.

The third port 78 receives the hydraulic pressure from a valve spool control line 90 communicating with the reducing line 48 on which the hydraulic pressure reduced to a lower pressure than the line pressure flows. This hydraulic pressure acts on the left side of a first land L10 and right side of a second land L11.

The first land L10 has a sectional area larger than that of the second land L11, and is disposed on the same axis as that of the second land L11. There are provided a third land L12 for opening and closing the second port 76 and the sixth port 84, a fourth land L13 for opening and closing the first port 74, a fifth land L14 for opening and closing the fifth port 82, a sixth land L15 having the same sectional area as that of the first land L10.

The second-third speed shift valve 60 includes a first port 92 that is connected to the fourth port 80 of the first-second speed shift valve 58 to be supplied with the hydraulic pressure; a second port 94 that is connected to a fifth port 82 of the first-second speed shift valve 58; a third port 96 that is connected to the third port 78 to be supplied with the hydraulic pressure from the valve spool control line 90; fourth, fifth and sixth ports 98, 100, 102 communicating with the third-fourth speed shift valve 62.

The second-third speed shift valve 60 includes a valve spool having a first land L16 for rendering the displacement of the valve spool by the hydraulic pressure supplied from the valve spool control line 90; a second land L17 having an area smaller than that of the first land L16; a third land L18 for opening and closing the first port 92; a fourth land L19 for opening and closing the second port 94; and a fifth land L20.

The third-fourth speed shift valve 62 includes a first port 104 connected to the fifth port 100 of the second-third speed shift valve 60; a second port 106 connected to the sixth port 102; a third port 108 connected to the fourth port 98; and fourth and fifth ports 110, 112 communicating with the fourth-fifth speed shift valve 64.

The third-fourth speed shift valve 62 includes a valve spool having a first land L21 on which the hydraulic pressure flowing through the fourth port 98 of the second-third speed shift valve 60 acts; a second land L22 having a sectional area smaller than that of the first land L22; a third land L23 for selectively opening and closing the first and second ports 104, 106; and a fourth land L24 for opening and closing an exit port EX.

The fourth-fifth speed shift valve 64 includes a first port and a second port 114, 116 respectively connected to the fourth port 110 and the fifth port 112 of the third-fourth speed shift valve 62 and a valve spool having a first land L25, communicating with the fourth port 110 of the third-fourth speed shift valve 62 on which the hydraulic pressure supplied from the valve spool control line 90 acts; a second land L26 having a sectional area smaller than that of the first land L25; and a third land L27 for opening and closing the second port 116.

The valve spool control line 90 is designed to supply the third port 78 of the first-second speed shift valve 58 and the third port 96 of the second-third speed shift valve 60. On an inlet of the third port 96, an orifice is formed to supply the hydraulic pressure to right and left sides of the first land L16, and a solenoid valve S1 for controlling the hydraulic pressure acting on the first land L16.

An orifice is formed on a hydraulic pressure line connecting the fourth port 98 of the second-third speed shift valve 60 to the third port 108 of the third-fourth speed shift valve 62. There is formed a hydraulic pressure line which a portion of the hydraulic pressure influences the left side of the first land L21 of the third-fourth speed shift valve 62, and the rest hydraulic pressure is supplied to the left side of the first land L10 of the first-second speed shift valve 58.

This hydraulic pressure line is to move the valve spool by a solenoid valve S2 for controlling the hydraulic pressure acting on the first land L21 of the third-fourth speed shift valve 62.

An orifice is formed on the hydraulic pressure line which connects the fourth port 110 of the third-fourth speed shift valve 62 to the first port 114 of the fourth-fifth speed shift valve 64, such that the hydraulic pressure is supplied to the right side of the sixth land L15 of the first-second speed shift valve 58. A solenoid valve S3 is provided for regulating the hydraulic pressure supplied to the left side surface of the first land L23 of the fourth-fifth speed shift valve.

The sixth port 84 of the first-second speed shift valve 58 is connected to the second clutch valve 66 through the first control line 118, thereby realizing the control. The first control line 118 is connected to the seventh port 120 of the second-third speed shift valve 60 through the second control line 122.

Further, the eighth port 124 of the second-third speed shift valve 60 is connected to the third clutch valve 68 through the third control line 126. The fourth control line 130 connecting the third clutch valve 68 to the sixth port 128 of the third-fourth speed shift valve 62 is connected to the fifth control line 134 through the seventh port 132, thereby supplying the hydraulic pressure to the fourth band valve 70. The fourth band valve 70 is connected to the third port 138 of the fourth-fifth shift valve 64 through the sixth control line 136, and the fourth port 140 of the fourth-fifth speed shift valve 64 is connected to the over drive unit valve 56 through the seventh control line 142.

The second clutch valve 66 supplies a portion of the hydraulic pressure supplied through the first-second shift valve 58 to the second clutch B2, and the third clutch valve 68 supplies a portion of hydraulic pressure supplied through the second-third speed shift valve 60 to the third clutch C3.

The fourth band valve 70 receiving the hydraulic pressure from the third-fourth speed shift valve 62 supplies a portion of the hydraulic pressure to the fourth-fifth speed shift valve 64, and the rest of the hydraulic pressure to the fourth band B3.

Further, the hydraulic pressure supplied to the fourth-fifth speed shift valve 64 is supplied to the fifth clutch B4 through the over drive unit valve 56.

The second clutch valve 66 is connected to the low/ reverse clutch B1 through the line 144 to exhaust the reverse operation pressure. The hydraulic pressure supplied from the manual valve 46 through the drive pressure line 88a is designed to be supplied to the fourth band B3 through the third clutch valve 68 and the second clutch valve 66.

The hydraulic pressure from the manual valve 46 through a drive pressure line 88b is designed to be supplied to the overrun forward clutch C3 through the fourth band valve, thereby achieving the engine brake.

Figure 3:
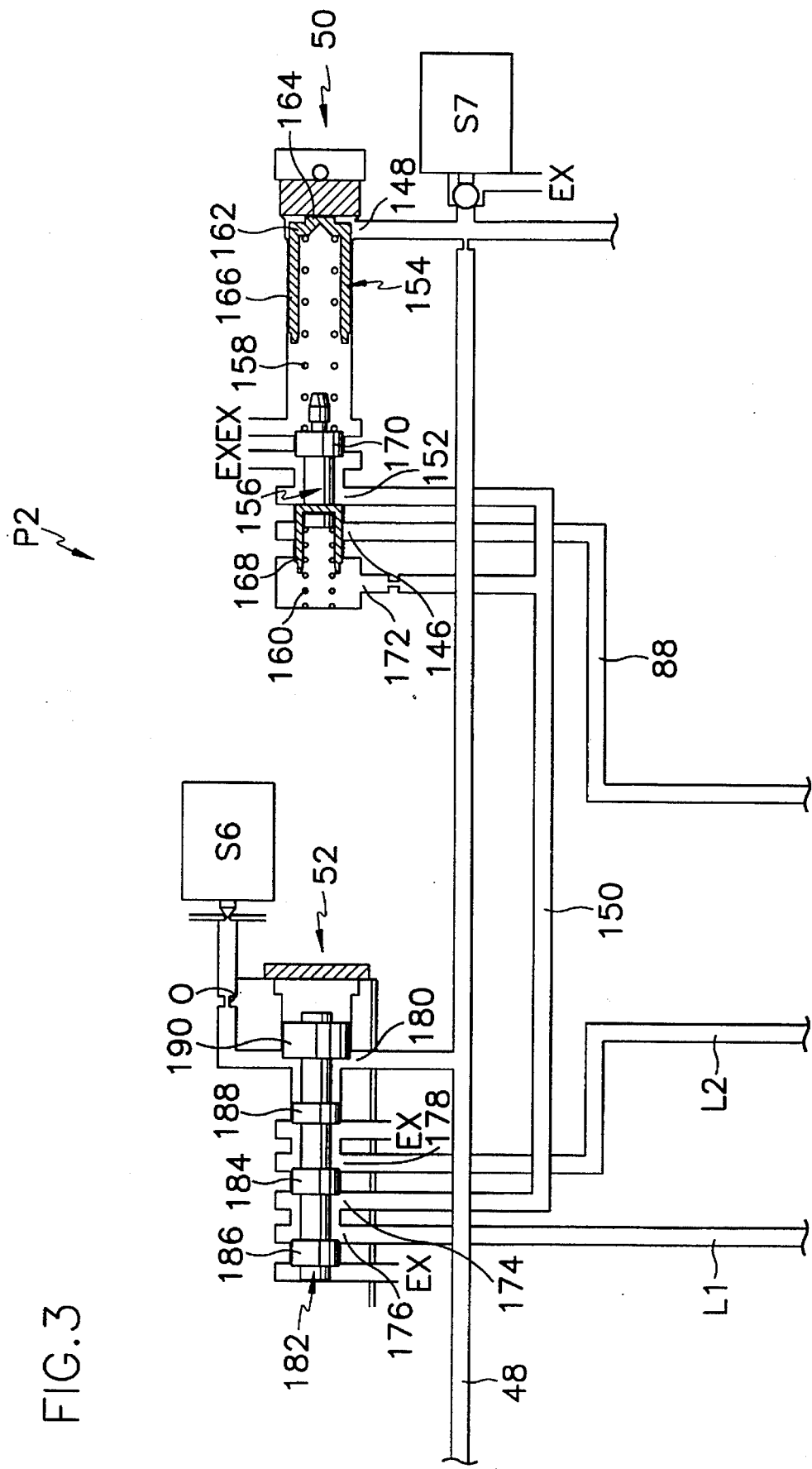
FIG. 3 is a detailed circuit diagram of a part P2 of FIG. 1.

Referring to FIG. 3, the torque control regulating valve 50 includes a first port 146 for receiving the drive pressure from the drive pressure line 88, a second port 148 receiving the hydraulic pressure from the reducing line 48 connected to the reducing valve 42, and a third port 152 communicating with the control switch valve 52.

The torque control regulating valve 50 further includes a first valve spool 154 and a second valve spool 156. The valve spools 154, 156 are disposed on the same axis line as each other while interposing a first elastic member 158 therebetween.

The second valve spool 156 is elastically supported by a second elastic member 160 having an elastic force opposite to that of the first elastic member 158.

The first valve spool 154 has a land 162 on which the hydraulic pressure supplied to the second port 148 acts. The first valve spool 154 is provided with a projection 164 such that the hydraulic pressure acts on the right side of the land 162 even in a state that the first valve spool 154 is completely moved rightward.

The hydraulic pressure is released or acts on the right side surface of the land 162 by the torque control regulating valve 50 controlled by the "ON/OFF" operation of the solenoid valve S7.

Further, the first valve spool 154 is provided with a sleeve 166 extending form the land 162 to stably support the first elastic member 158.

The second valve spool includes a first land 168 for supplying the hydraulic fluid into the first port to the third port 152, and a second land 170 for opening and closing the exit port EX.

The first land 168 is formed in a sleeve-shape for stably supporting the second elastic member 160. The hydraulic pressure from the third port 152 is supplied to the fourth port 172 communicating with the control line 150, thereby controlling the second valve spool 156.

The control switch valve 52 receiving the hydraulic pressure from the control line 150 includes a first port 174, and second and third ports 176, 178 selectively receiving the hydraulic pressure flowing into the first port in accordance with the "ON/OFF" operation of the solenoid valve S6.

The solenoid valve S6 exhausts the hydraulic pressure through the fourth port 180 of the control switch valve 52 or interrupts the hydraulic pressure of the reducing line 48, such that the valve spool 182 of the control switch valve 52 is moved rightward or leftward.

The valve spool 182 of the control switch valve 52 includes first, second and third lands 184, 186 and 188 for selectively supplying the hydraulic pressure flowing into the first port 174 to one of the second and third ports 176, 178.

The valve spool 182 further includes a fourth land 190 having a sectional area larger than the first, second and third lands 184, 186 and 188. Although the hydraulic pressure flowing into the fourth port 180 acts on both the left and right side of the fourth land 190, since an orifice O is formed on an inlet of the chamber C, an exhausted oil becomes more than a supplied oil when the solenoid valve S6 is controlled to be turned "ON", thereby moving the valve spool 182 rightward.

Figure 4:
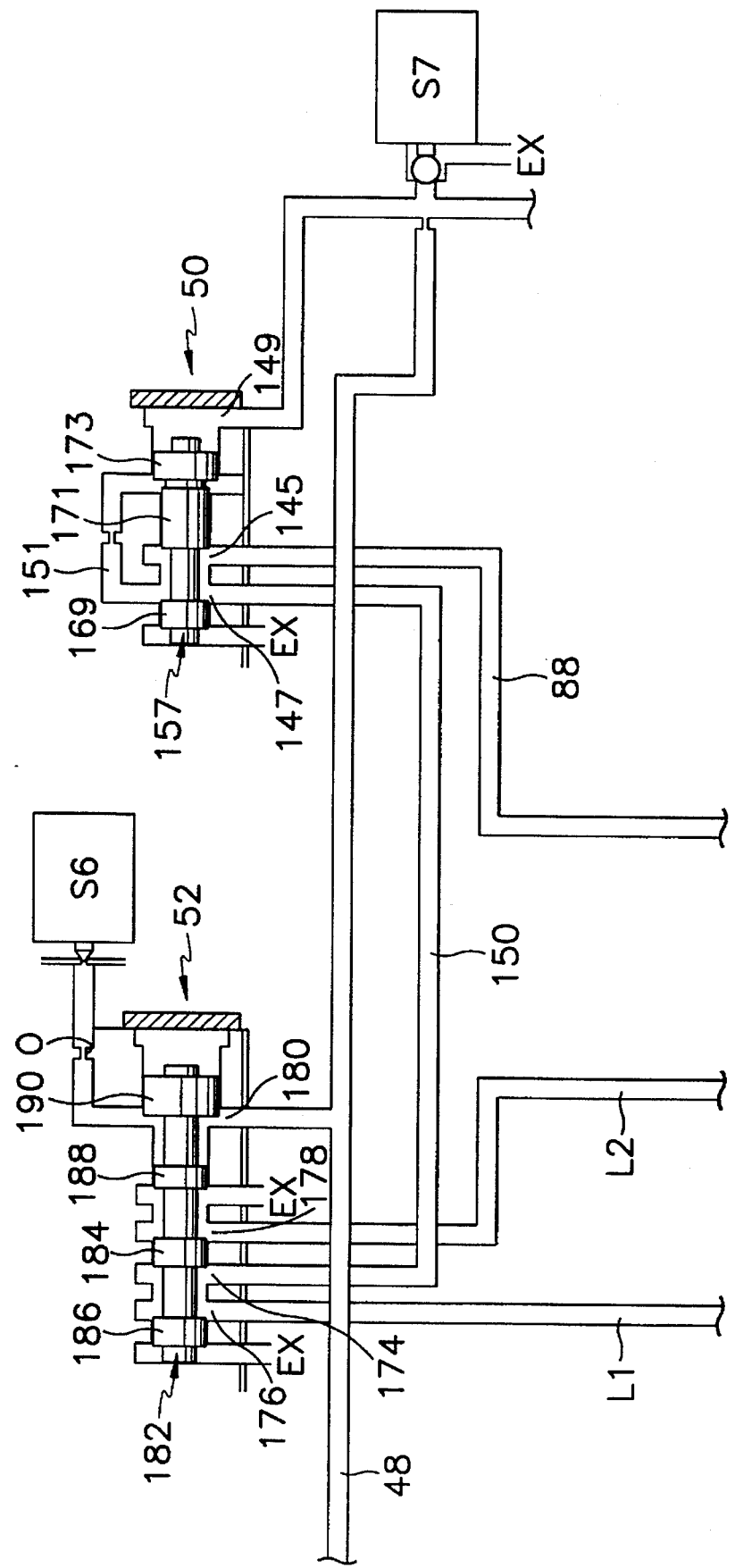
FIG. 4 is a detailed circuit diagram of a part P2 of FIG. 1 in accordance with another preferred embodiment.

FIG. 4 is a view showing another embodiment of the torque control regulating valve 50.

The torque control regulating valve shown in FIG. 3 has a structure that the ports are changed in accordance with the elastic force of the elastic members and the hydraulic pressure. However, the ports of the torque control regulating valve shown in FIG. 4 are changed in accordance with only the hydraulic pressure supplied from the reducing line 48.

That is, the torque control regulating valve 50 includes a first port 145 for receiving the hydraulic pressure from the drive pressure line 88, a second port 147 for supplying the hydraulic pressure to the control switch valve 52 through the control line 150, and a third port 149 for receiving the hydraulic pressure from the reducing line 48.

The torque control regulating valve 50 further includes a valve spool 157 having a first land 169 for closing and opening the second port 147, a second land 171 and a third land 173.

The third land 173 has a sectional area larger than those of the other lands, and changes the pressure acting on the third land in accordance with a duty control of the solenoid valve S7 to move the valve spool 157. The hydraulic pressure flowing into the first port 145 acts on the left side of the third land 173 through the bypass line 151.

Figure 5:
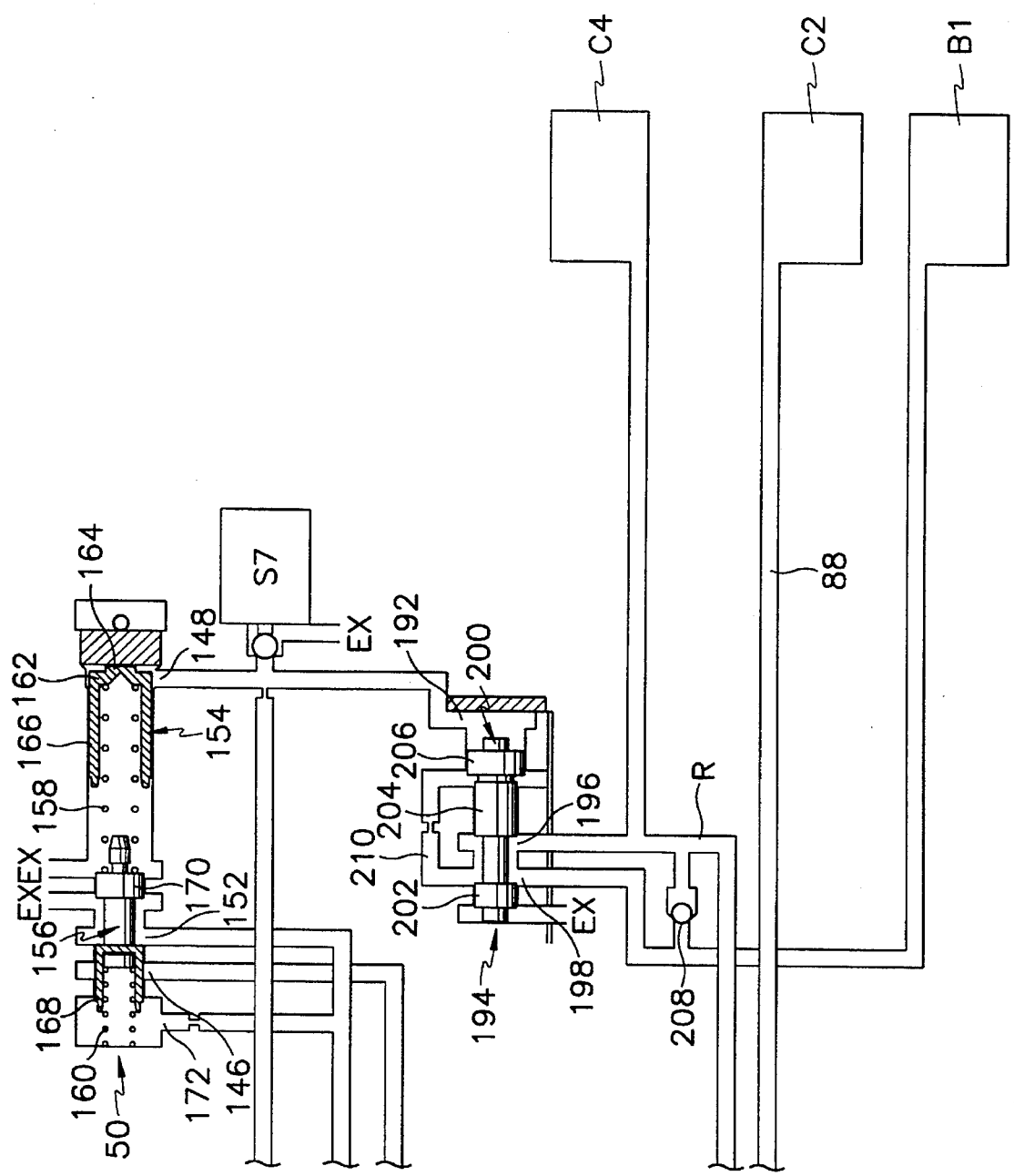
FIG. 5 is a detailed circuit diagram of a reverse control part in accordance with the present invention.

Referring to FIG. 5, the reverse clutch inhibitor valve 194 includes a first port 192 for receiving the hydraulic pressure from the second port 148 of the torque control regulating valve 50, a second port 196 for receiving the hydraulic pressure from the reverse pressure line R, and a third port 198 for supplying the hydraulic pressure flowing into the second port 196 to the low/reverse brake B1.

The reverse clutch inhibitor valve 194 further includes a valve spool 200 having a first land 202 for opening and closing the third port, a second land 204 and a third land 206.

The third land 206 is moved by the hydraulic pressure controlled by the solenoid valve S7.

A check valve member 208 is disposed between the second port 196 and the third port 198, such that the hydraulic pressure flowing into the second port 196 is supplied to the low/reverse brake B1 only through the third port 198.

Further, the hydraulic pressure flowing into the second port 196 works on the left side surface of the third land 206 through the by-pass line 210.

In the shift control device as described above, the hydraulic pressure generated from the oil pump 30 is supplied to the reducing valve 42 along the line pressure line 44 and a portion of the line pressure is supplied to the over drive unit direct clutch C5 through the over drive unit valve 56.

Further, another portion of the remaining hydraulic pressure is supplied to the first-second speed shift valve 58 through the drive pressure line 88, and simultaneously, directly supplied to the forward clutch C2 to engage it, thereby achieving the first forward speed ratio.

At this point, the hydraulic pressure supplied to the reducing valve 42 is reduced to be lower than the line pressure and is supplied to the second port 148 of the torque control regulating valve 50 through the reducing line 48, and thereby also to the fourth port 180 of the control switch valve 52.

At this point, the solenoid valve S7 is controlled to be turned "OFF" by the transmission control unit to interrupt the hydraulic pressure, such that the first valve spool 154 of the torque control regulating valve 50 receives the hydraulic pressure on the right side of the land 162.

Accordingly, the first valve spool 154 is moved leftward while compressing the first elastic member 158, and thereby moving the second valve spool 156 leftward and compressing the second elastic member 160.

By this operation, the first port 146 of the torque control regulating valve 50 is to communicate with the third port 152. At this point, a portion of the hydraulic pressure by the drive pressure line 88) to the forward clutch C2 in the first forward speed ratio is supplied to the first port 146 of the torque control regulating valve 50, and thereby to the first port 174 of the control switch valve 52 through the third port 152 and the control line 150.

At this point, the control switch valve 52 receives the hydraulic pressure from the reducing line 48 through the fourth port 180 working on the left side surface of the fourth land 190 in a larger scale than the right side surface, thereby moving the valve spool 182 rightward.

Accordingly, the hydraulic pressure flowing into the first port 174 of the control switch valve 52 is supplied to the second speed shift line L2 through the third port 178, and thereby to the second port 76 of the first-second speed shift valve 58.

At this point, since the solenoid valve S2 is controlled to be turned "OFF" by the transmission control unit, the hydraulic pressure acts on the left side surface of the first land L10 of the first-second speed shift valve 58, thereby moving the valve spool rightward.

By the above operation, the third land L12 of the valve spool is located on the right side of the second port 76, such that the second port 76 communicates with the sixth port 84. Therefore, the hydraulic pressure flowing into the second shift line L2 is supplied to the second clutch valve 66 through the first control line 118, and a portion of the hydraulic pressure is supplied to the second clutch B2 while pushing the valve spool. The remaining hydraulic pressure is supplied to the seventh port 120 of the second-third shift valve 60 through the second control line 122.

Accordingly, the second clutch B2 is controlled with the first-second speed shift ratio by the torque control regulating valve 50 before accomplishing the second forward speed ratio from the first forward speed ratio.

At this point, the solenoid valve S3 is controlled to be turned "OFF" by the transmission control unit, such that the hydraulic pressure acts on the right side surface of the sixth land L15 of the first-second shift valve 58 thereby moving the valve spool rightward.

As a result, the hydraulic pressure flowing into the seventh port 86 of the first-second speed shift valve 58 is supplied to the second clutch valve B2 through the sixth port 84, the first control line 118 and the second clutch valve 66, such that the hydraulic pressure controlled by the torque control regulating valve 50 is changed with a drive pressure, thereby realizing the second forward speed ratio.

At this point, the solenoid valves S7, S6 are controlled to be turned "OFF" and "ON", respectively, whereby the torque pressure flows into the first port 74 of the first-second speed shift valve 58 through the first shift line L1. At this point, the solenoid valves S1, S2 are controlled to be turned "ON" and "OFF", respectively, whereby the valve spools of the first-second speed shift valve 58 and the second-third speed shift valve 60 are moved leftward, respectively. Accordingly, a portion of the hydraulic pressure flowing into the right side end of the second clutch valve 66 stands by the seventh port 120 of the second-third speed shift valve 60 and the hydraulic pressure of the first shift line L1 flows into the second port 94 of the second-third speed shift valve 60 through the first and fifth ports of the first-second speed shift valve 58.

At this point, since the valve spool of the second-third speed shift valve 60 is in the state of moving rightward, the hydraulic pressure flowing into the second port 94 is supplied to the third clutch valve 68 through the eighth port 124 and the third control line 126 while pushing the valve spool, and whereby a portion of the hydraulic pressure flows along the fourth control line 130 and the remaining hydraulic pressure is supplied to the third clutch C3, thereby accomplishing the second-third speed shift control.

The hydraulic pressure of the fourth control line 130 flows into the sixth port, and since the solenoid valve S2 is controlled to be turned "OFF", the hydraulic pressure of the fourth control line 130 stands by the sixth port.

As described above, when the second-third speed shift control is completed, the transmission control unit controls the solenoid valve S1 to be turned "ON", such that the valve spool of the second—third speed shift valve is moved rightward, and simultaneously, the hydraulic pressure acts on the right side of the sixth land L15 of the first-second speed shift valve 58, thereby moving the valve spool of the first-second shift valve 58 leftward.

As the result, the hydraulic pressure of the drive pressure line 88 which is supplied to the seventh port 120 of the second-third shift valve through the first-second speed shift valve 58 and the second control line 122 and stands by the seventh port 120 flows into the third control line 126 through the eighth port 124 and converts the engaging hydraulic pressure of the third clutch C3 into the drive pressure, thereby accomplishing the third forward speed ratio.

Further, when the vehicle's speed gradually increases in the third forward speed ratio, the transmission control unit controls the torque control regulating valve 50 and the control switch valve 52 and supplies the hydraulic pressure of the control unit 150 to the second speed shift line L2, and then to the second port 76 of the first-second speed shift valve 58.

At this point, the solenoid valves S1, S2 and S3 are controlled to be turned "OFF" by the transmission control unit, such that the valve spool of the first-second speed shift valve 58 is moved leftward and the valve spools of the second-third speed shift, third-fourth speed shift and the fourth-fifth speed shift valves 60, 62 and 64 are moved rightward.

Accordingly, the control pressure flowing into the second port 76 of the first-second speed shift valve 58 is supplied to the second and fifth ports 94, 100 of the second-third speed shift valve 62, and then to-the fifth control line 134 through the first and seventh ports 104, 132 of the third-fourth speed shift valve 62.

At this point, the control pressure flowing into the fifth control line 134 is supplied to the fifth band valve 70, and at the same time, a portion of the pressure engages the fourth band B3 to accomplish the third-fourth speed shift control. Another portion of the pressure stands by the third port 138.

When the third-fourth speed shift control is accomplished, the transmission control unit controls the solenoid valve S2 to be turned "ON", such that the valve spool is moved leftward.

As a result, the drive pressure standing by the sixth port 128 of the third-fourth speed shift valve 62 flows into the fifth control line 134 through the seventh port 132, and is supplied to the fourth band B3 through the fourth band valve 70 thereby realizing the fourth forward speed ratio by the drive pressure.

Further, when the vehicle's speed gradually increases in the fourth forward speed ratio, the solenoid valves S7, S6 are controlled by the transmission control unit so that the control pressure flows into the first speed shift line n1 and supplies the hydraulic pressure to the first port 74 of the first-second speed shift valve 58.

At the same time, the transmission control unit controls the solenoid valves S1, S3 to be turned "OFF" and solenoid valve S2 to be turned "ON" so that the hydraulic pressure flowing into the first port 74 of the first-second speed shift valve 58 flows into the second port 106 of the third-fourth speed shift valve 62 through the second and sixth ports 94, 102 of the second-third speed shift valve 60 and thereby into the second port 116 of the fourth-fifth speed shift valve 64 through the fifth port 112.

At this point, since the solenoid valve is in the "OFF" status, moving the valve spool rightward, the hydraulic pressure flowing into the second port 116 flows into the seventh control line 142 through the fourth port 140 and is supplied to the over drive unit valve 56, and thereby to the fifth clutch B4. And at the same time, the hydraulic pressure supplied to the over drive unit valve 56 from the line pressure line 44 is interrupted thereby releasing the drive pressure of the over drive unit direct clutch C5.

That is, the fourth-fifth speed shift control is realized by releasing the over drive unit direct clutch C5, simultaneously with engaging the fifth clutch B4. At this point, the hydraulic pressure controlled by the torque control regulating valve 50 is supplied to the fifth clutch B4.

When the fourth-fifth speed shift control is realized, the transmission control unit controls the solenoid valve S2 to be turned "ON" so that the valve spool is moved leftward.

As a result, the drive pressure standing by the second port 116 of the fourth-fifth speed shift valve 64 is supplied to the drive unit valve 56 along the seventh control line 142 through the fourth port 140 while pushing the valve spool thereof, and then to the fifth clutch B4 to engage it, whereby realizing the fifth forward speed ratio.

Further, when the shift lever is shifted to the reverse "R" range, a portion of the hydraulic pressure is directly supplied to the reverse input clutch C4 from the manual valve 46 through the reverse pressure line R. The remaining hydraulic pressure is supplied to the over drive unit valve 56 through the line 57 from the line pressure line 44 while pushing the valve spool, and then to the over drive unit direct clutch C5.

At this .point, the transmission control unit controls the solenoid valve S7 to be turned "OFF", such that the hydraulic pressure is formed on the first port 192 of the reverse clutch inhibitor valve 194 from FIG. 5.

Accordingly, the valve spool 200 of the reverse clutch inhibitor valve 194 is moved leftward, such that the first land 202 is located on the left side of the third port 198, and the second land 204 is located on the right side of the second port 196.

That is, the second port 196 communicates with the third port 198, such that a portion of the hydraulic pressure supplied to the reverse input clutch C4 is supplied to the low/reverse clutch B1 through the second and third ports 196, 198, thereby realizing the reverse.

Further, if the shift lever is selected to the reverse "R" range, when the vehicle is in a forward driving status, the transmission control unit controls the solenoid valve S7 to be turned "ON" so as to exhaust the hydraulic pressure which is supplied to the first port 192 of the reverse clutch inhibitor valve 194.

Accordingly, the hydraulic pressure acting on the right side of the third land 206 of the valve spool 200 is released. At this point, the hydraulic pressure flowing into the second port 196 acts on the left side surface of the third land 206 while flowing along the by-pass line 210, thereby moving the valve spool 200 rightward.

By the above operation, since the first land 202 is designed to be located between the second port 196 and the third port 198, the hydraulic pressure flowing into the second port 196 is designed not to be supplied to the low/reverse clutch B1.

That is, since the low/reverse clutch B1 which has to be engaged naturally in the reverse "R" range is not engaged, in this case, the transmission control unit operates the solenoid valve S7 as a fail safe means.

In the hydraulic pressure control system of the present invention as described above, since the clutch is engaged by the torque pressure and the drive pressure is then supplied to the clutch by the operation of the solenoid, the system has an advantage that a speedy response ability is attained.

Further, since the system uses only the hydraulic pressure without using an elasticity of an elastic member, the structure of the valve can be simplified and ensure the control.

Further, since the system can realize fifth forward speed ratio, the fuel consumption ratio and the shift sense can be improved.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A hydraulic pressure control system for an automatic transmission, the system comprising:

an oil pump for generating a hydraulic pressure;

a plurality of friction members controlled by the hydraulic pressure in proportion to forward and reverse speed ratios;

a torque control regulating valve for reducing the hydraulic pressure from the oil pump in accordance with a variation of torque from a torque converter;

a control switch valve for selectively supplying the reduced hydraulic pressure, generated by the torque control regulating valve, to partially engage a friction member prior to enabling the hydraulic pressure to work as one of a shift valve control pressure and as a friction member full-engagement pressure; and first-second, second-third, third-fourth, and fourth-fifth speed shift valves each of which ports are changed for selectively partially engaging the friction members with the reduced hydraulic pressure supplied from the control switch valve and thereafter for fully engaging the friction members with a drive pressure.

2. The hydraulic pressure control system of claim 1, further comprising:

first-second, second-third, third-fourth and fourth-fifth shift valves for transmitting the torque of the torque converter to gear elements of each speed ratio;

wherein the shift valves are controlled by the ON/OFF operation of three solenoid valves, such that each valve supplies two control pressures of the control switch valve to the friction members and then supplies the drive pressure to the friction members thereby realizing each forward speed ratio.

3. The hydraulic pressure control system of claim 2, further comprising:

wherein each shift valve is controlled by one of the solenoid valves to select which one of the two control pressures will be supplied to a friction member.

4. The hydraulic pressure control system of claim 1, wherein the first-second speed shift valve is connected to a second clutch through a first control line and the second clutch valve to engage the second clutch.

5. The hydraulic pressure control system of claim 1, wherein the second-third speed shift valve receives the torque pressure and the drive pressure through a second control line and supplies the torque and drive pressures to a third clutch by controlling the third clutch valve through a third control line, thereby engaging the third clutch.

6. The hydraulic pressure control system of claim 1, wherein the third-fourth speed shift valve is connected to the third clutch valve through a fourth control line to receive the torque pressure and the drive pressure, and controls the fourth band through the fifth control line to engage the fourth band.

7. The hydraulic pressure control system of claim 1, wherein the fourth-fifth speed shift valve is connected to the fourth band valve through the sixth control line to receive the torque pressure and the drive pressure, and engages an over drive unit direct clutch by controlling the over drive unit valve through the seventh control line.

8. The hydraulic pressure control system of claim 1, wherein the hydraulic pressure directly engages the over drive unit direct clutch through the forward clutch and the over drive unit valve.

9. The hydraulic pressure control system of claim 1, wherein the torque control regulating valve comprises:

a first port for receiving the drive pressure;

a second port for receiving the hydraulic pressure which is lower than the drive pressure;

a third port which is an exhaust port;

a first valve spool which is moved by the hydraulic pressure flowing into the second port, the hydraulic pressure being changed by the "ON/OFF" operation of the solenoid valve; and a second valve spool for opening and closing the first and third ports, the first and second valve spools elastically disposed by first and second elastic member, respectively.

10. The hydraulic pressure control system of claim 1, wherein the control switch valve comprises:

a first port for receiving the variable torque pressure of the torque control regulating valve;

second and third ports for supplying the variable torque pressure to the first and second speed shift line;

a fourth port for receiving the control pressure which is lower than the drive pressure; and a valve spool having a first land which moves to right and left sides of the first port, a second land for closing and opening the second port, a third land for opening and closing the .third port, and a fourth land which is larger than other lands, the hydraulic pressure working on left and right side surfaces of the fourth land.

11. A hydraulic pressure control system as in claim 1, further comprising:

a reverse clutch inhibitor valve for interrupting the hydraulic pressure which is supplied to a low/reverse clutch so that, when a shift lever is shifted to a reverse "R" range, a reverse shift control does not occur.

12. The hydraulic pressure control system of claim 11, wherein the reverse clutch inhibitor valve comprises:

a first port for receiving or releasing the hydraulic pressure which is lower than the drive pressure in accordance with the "ON/OFF" operation of a solenoid valve;

a second port for receiving the hydraulic pressure from the reverse pressure line;

a third port for supplying the hydraulic pressure flowing into the second port to a low/reverse clutch; and a valve spool having first, second, and third lands for opening and closing said ports.

13. A hydraulic pressure control system as in claim 1, wherein:

the torque control regulating valve includes a first spool and a second spool biased apart by a separating elastic member.

14. A hydraulic pressure control system as in claim 13, wherein:

each of the first spool and the second spool of the torque control regulating valve has an elastic biasing member in addition to the separating elastic member.

15. A hydraulic pressure control system as in claim 1, wherein:

the torque control regulating valve includes a single spool having a plurality of disparately sized lands.

* * * * *